US009633508B2

(12) United States Patent
Johnson

(10) Patent No.: US 9,633,508 B2
(45) **Date of Patent: *Apr. 25, 2017**

(54) ENHANCED VIDEO GAMING MACHINE

(71) Applicant: IGT, Las Vegas, NV (US)

(72) Inventor: Sam Johnson, Suwanee, GA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/836,524

(22) Filed: Aug. 26, 2015

(65) Prior Publication Data

US 2015/0379818 A1 Dec. 31, 2015

Related U.S. Application Data

(63) Continuation of application No. 14/333,112, filed on Jul. 16, 2014, now Pat. No. 9,123,203, which is a continuation of application No. 11/968,633, filed on Jan. 2, 2008, now Pat. No. 8,784,213, which is a continuation of application No. 10/689,407, filed on Oct. 20, 2003, now Pat. No. 7,335,106.

(51) Int. Cl.
*A63F 13/00* (2014.01)
*G07F 17/32* (2006.01)

(52) U.S. Cl.
CPC .......... *G07F 17/3244* (2013.01); *G07F 17/32* (2013.01); *G07F 17/3227* (2013.01); *G07F 17/3234* (2013.01)

(58) Field of Classification Search
None
See application file for complete search history.

(56) References Cited

U.S. PATENT DOCUMENTS 4,004,097 A 1/1977 Spaulding
4,261,012 A 4/1981 Maloomian
4,283,709 A 8/1981 Lucero et al.
4,357,624 A 11/1982 Greenberg
4,503,429 A 3/1985 Schreiber
(Continued)

FOREIGN PATENT DOCUMENTS

EP 946028 9/1999
WO WO 9416781 8/1994
(Continued)

*Primary Examiner* — Sunit Pandya
(74) *Attorney, Agent, or Firm* — Neal, Gerber & Eisenberg LLP

(57) ABSTRACT

The present invention provides a closed-loop system that allows the operator of video gaming machines or other systems to define promotional events for the particular machines or systems, monitor the activity of the particular machines or systems, and grant awards. More specifically, the promotional events may include scheduling information, winning criteria and awards. During the period of time that the promotional event is active, the activity of the machine or system is monitored to determine if the winning criteria has been satisfied. If the winning criteria are satisfied, information pertaining to event is recorded. The present invention is applicable to a variety of embodiments including video poker machines, black jack machines or other gaming and gambling machines, as well as other systems that include a display mechanism and an activity that can be monitored.

22 Claims, 6 Drawing Sheets

(56) References Cited

U.S. PATENT DOCUMENTS

| | | | |
|---|---|---|---|
| 4,518,823 A | 5/1985 | Kessler | |
| 4,521,014 A | 6/1985 | Sitrick | |
| 4,527,798 A | 7/1985 | Siekierski et al. | |
| 4,636,951 A | 1/1987 | Harlick | |
| 4,652,998 A | 3/1987 | Koza et al. | |
| 4,689,742 A | 8/1987 | Troy et al. | |
| 4,694,490 A | 9/1987 | Harvey et al. | |
| 4,704,725 A | 11/1987 | Harvey et al. | |
| 4,710,873 A | 12/1987 | Breslow et al. | |
| 4,743,022 A | 5/1988 | Wood | |
| 4,760,527 A | 7/1988 | Sidley | |
| 4,835,624 A | 5/1989 | Black et al. | |
| 4,858,123 A | 8/1989 | Alexoff et al. | |
| 4,880,237 A | 11/1989 | Kishishita | |
| 4,926,327 A | 5/1990 | Sidley | |
| 4,965,825 A | 10/1990 | Harvey et al. | |
| 5,007,627 A | 4/1991 | Giannetti et al. | |
| 5,018,021 A | 5/1991 | Slater | |
| 5,091,713 A | 2/1992 | Horne et al. | |
| 5,105,184 A | 4/1992 | Pirani et al. | |
| 5,121,477 A | 6/1992 | Koopmans et al. | |
| 5,179,517 A | 1/1993 | Sarbin et al. | |
| 5,231,568 A | 7/1993 | Cohen et al. | |
| 5,233,423 A | 8/1993 | Jernigan et al. | |
| 5,239,165 A | 8/1993 | Novak | |
| 5,249,800 A | 10/1993 | Hilgendorf et al. | |
| 5,251,302 A | 10/1993 | Weigl et al. | |
| 5,251,738 A | 10/1993 | Dabrowski | |
| 5,259,613 A | 11/1993 | Marnell, II | |
| 5,265,874 A | 11/1993 | Dickinson et al. | |
| 5,276,312 A | 1/1994 | McCarthy | |
| 5,280,909 A | 1/1994 | Tracy | |
| 5,290,033 A | 3/1994 | Bittner et al. | |
| 5,321,241 A | 6/1994 | Craine | |
| 5,321,568 A | 6/1994 | Hatam-Tabrizi | |
| 5,332,076 A | 7/1994 | Ziegert | |
| 5,342,037 A | 8/1994 | Martin | |
| 5,342,047 A | 8/1994 | Heidel et al. | |
| 5,350,168 A | 9/1994 | Sheridan | |
| 5,371,345 A | 12/1994 | LeStrange et al. | |
| 5,412,404 A | 5/1995 | Candy | |
| 5,420,406 A | 5/1995 | Izawa et al. | |
| 5,429,361 A | 7/1995 | Raven et al. | |
| 5,450,938 A | 9/1995 | Rademacher | |
| 5,456,648 A | 10/1995 | Edinburg et al. | |
| 5,470,079 A | 11/1995 | LeStrange et al. | |
| 5,475,205 A | 12/1995 | Behm et al. | |
| 5,477,952 A | 12/1995 | Castellano et al. | |
| 5,480,158 A | 1/1996 | Schulze et al. | |
| 5,531,309 A | 7/1996 | Kloss et al. | |
| 5,531,441 A | 7/1996 | Dabrowski et al. | |
| 5,544,728 A | 8/1996 | Dabrowski | |
| 5,553,864 A | 9/1996 | Sitrick | |
| 5,557,086 A | 9/1996 | Schulze et al. | |
| 5,559,312 A | 9/1996 | Lucero | |
| 5,577,959 A | 11/1996 | Takemoto et al. | |
| 5,580,311 A | 12/1996 | Haste, III | |
| 5,586,936 A | 12/1996 | Bennett et al. | |
| 5,586,937 A | 12/1996 | Menashe | |
| 5,595,538 A | 1/1997 | Haste, III | |
| 5,605,506 A | 2/1997 | Hoorn et al. | |
| 5,611,729 A | 3/1997 | Schumacher et al. | |
| 5,611,730 A | 3/1997 | Weiss | |
| 5,613,912 A | 3/1997 | Slater | |
| 5,624,316 A | 4/1997 | Roskowski et al. | |
| 5,627,356 A | 5/1997 | Takemoto et al. | |
| 5,655,961 A | 8/1997 | Acres et al. | |
| 5,678,679 A | 10/1997 | Berman | |
| 5,692,743 A | 12/1997 | Yano et al. | |
| 5,709,603 A | 1/1998 | Kaye | |
| 5,740,549 A | 4/1998 | Reilly et al. | |
| 5,741,183 A | 4/1998 | Acres et al. | |
| 5,755,621 A | 5/1998 | Marks et al. | |
| 5,761,647 A | 6/1998 | Boushy | |
| 5,769,269 A | 6/1998 | Peters | |
| 5,770,533 A | 6/1998 | Franchi | |
| 5,772,510 A | 6/1998 | Roberts | |
| 5,774,873 A | 6/1998 | Berent et al. | |
| 5,785,592 A | 7/1998 | Jacobsen | |
| 5,791,990 A | 8/1998 | Schroeder et al. | |
| 5,813,912 A | 9/1998 | Shultz | |
| 5,816,918 A | 10/1998 | Kelly et al. | |
| 5,818,026 A | 10/1998 | Melling et al. | |
| 5,830,065 A | 11/1998 | Sitrick | |
| 5,844,601 A | 12/1998 | McPheely et al. | |
| 5,844,808 A | 12/1998 | Konsmo et al. | |
| 5,871,398 A | 2/1999 | Schneier et al. | |
| 5,880,731 A | 3/1999 | Liles et al. | |
| 5,901,951 A | 5/1999 | Yamaguchi | |
| 5,907,321 A | 5/1999 | Grossman et al. | |
| 5,908,354 A | 6/1999 | Okuniewicz | |
| 5,909,486 A | 6/1999 | Walker et al. | |
| 5,915,588 A | 6/1999 | Stoken et al. | |
| 5,919,090 A | 7/1999 | Mothwurf | |
| 5,941,772 A | 8/1999 | Paige | |
| 5,971,271 A | 10/1999 | Wynn et al. | |
| 5,984,780 A | 11/1999 | Takemoto et al. | |
| 5,984,783 A | 11/1999 | Kikuchi et al. | |
| 5,990,927 A | 11/1999 | Hendricks et al. | |
| 6,003,013 A | 12/1999 | Boushy et al. | |
| 6,012,832 A | 1/2000 | Saunders et al. | |
| 6,014,594 A | 1/2000 | Heidel et al. | |
| 6,015,344 A | 1/2000 | Kelly et al. | |
| 6,024,640 A | 2/2000 | Walker et al. | |
| 6,036,601 A * | 3/2000 | Heckel | G06Q 30/02 273/461 |
| 6,048,269 A | 4/2000 | Burns et al. | |
| 6,048,271 A | 4/2000 | Barcelou | |
| 6,049,823 A | 4/2000 | Hwang | |
| 6,056,289 A | 5/2000 | Clapper, Jr. | |
| 6,068,552 A | 5/2000 | Walker et al. | |
| 6,089,975 A | 7/2000 | Dunn | |
| 6,098,837 A | 8/2000 | Izawa et al. | |
| 6,110,044 A | 8/2000 | Stern | |
| 6,113,492 A | 9/2000 | Walker et al. | |
| 6,113,495 A | 9/2000 | Walker et al. | |
| 6,128,550 A | 10/2000 | Heidel et al. | |
| 6,135,884 A | 10/2000 | Hedrick et al. | |
| 6,139,431 A | 10/2000 | Walker et al. | |
| 6,142,876 A | 11/2000 | Cumbers | |
| 6,146,276 A | 11/2000 | Okuniewicz | |
| 6,170,744 B1 | 1/2001 | Lee et al. | |
| 6,175,358 B1 | 1/2001 | Scott-Jackson et al. | |
| 6,186,893 B1 * | 2/2001 | Walker | G06Q 20/20 273/143 R |
| 6,190,256 B1 | 2/2001 | Walker et al. | |
| 6,203,428 B1 | 3/2001 | Giobbi et al. | |
| 6,227,972 B1 | 5/2001 | Walker et al. | |
| 6,229,879 B1 | 5/2001 | Walker et al. | |
| 6,234,900 B1 | 5/2001 | Cumbers | |
| 6,241,118 B1 | 6/2001 | Tramontina | |
| 6,244,957 B1 | 6/2001 | Walker et al. | |
| 6,249,885 B1 | 6/2001 | Johnson et al. | |
| 6,251,014 B1 | 6/2001 | Stockdale et al. | |
| 6,253,119 B1 | 6/2001 | Dabrowski | |
| 6,263,258 B1 | 7/2001 | Dabrowski | |
| 6,270,406 B1 | 8/2001 | Sultan | |
| 6,280,318 B1 | 8/2001 | Criss-Puszkiewicz et al. | |
| 6,280,326 B1 | 8/2001 | Saunders | |
| 6,280,328 B1 | 8/2001 | Holch et al. | |
| 6,286,756 B1 | 9/2001 | Stinson et al. | |
| 6,302,793 B1 | 10/2001 | Fertitta, III et al. | |
| 6,315,666 B1 | 11/2001 | Mastera et al. | |
| 6,327,351 B1 | 12/2001 | Walker et al. | |
| 6,340,331 B1 | 1/2002 | Saunders et al. | |
| 6,347,794 B2 | 2/2002 | Scrymgeour et al. | |
| 6,354,749 B1 | 3/2002 | Pfaffenberger, II | |
| 6,368,216 B1 | 4/2002 | Hedrick et al. | |
| 6,375,567 B1 | 4/2002 | Acres | |
| 6,379,246 B1 | 4/2002 | Dabrowski | |
| 6,379,247 B1 | 4/2002 | Walker et al. | |
| 6,390,917 B1 | 5/2002 | Walker et al. | |
| 6,425,825 B1 | 7/2002 | Sitrick | |
| 6,443,456 B1 | 9/2002 | Gajor | |

(56) References Cited

U.S. PATENT DOCUMENTS 6,459,440 B1 10/2002 Monnes et al.
6,460,848 B1 10/2002 Soltys et al.
6,500,067 B1 12/2002 Luciano et al.
6,503,147 B1 1/2003 Stockdale et al.
6,508,710 B1 1/2003 Paravia et al.
6,517,435 B2 2/2003 Soltys et al.
6,517,436 B2 2/2003 Soltys et al.
6,520,857 B2 2/2003 Soltys et al.
6,527,271 B2 3/2003 Soltys et al.
6,527,638 B1 3/2003 Walker et al.
6,530,836 B2 3/2003 Soltys et al.
6,530,837 B2 3/2003 Soltys et al.
6,533,276 B2 3/2003 Soltys et al.
6,533,659 B2 3/2003 Seymour et al.
6,533,662 B2 3/2003 Soltys et al.
6,540,609 B1 4/2003 Paige
6,547,664 B2 4/2003 Saunders
6,548,967 B1 4/2003 Dowling et al.
6,558,256 B1 5/2003 Saunders
6,577,733 B1 6/2003 Charrin
6,579,179 B2 6/2003 Poole et al.
6,579,180 B2 6/2003 Soltys et al.
6,579,181 B2 6/2003 Soltys et al.
6,582,310 B1 6/2003 Walker et al.
6,592,456 B2 7/2003 Walker et al.
6,595,857 B2 7/2003 Soltys et al.
6,598,788 B1 7/2003 Dabrowski
6,620,046 B2 9/2003 Rowe
6,623,357 B2 9/2003 Chowdhury
6,625,578 B2 * 9/2003 Spaur .................... G06Q 30/02 463/40
6,638,163 B2 10/2003 Moody
6,638,170 B1 10/2003 Crumby
6,641,483 B1 11/2003 Luciano et al.
6,641,484 B2 11/2003 Oles et al.
6,645,068 B1 11/2003 Kelly et al.
6,648,757 B1 11/2003 Slomiany et al.
6,650,427 B2 11/2003 Brooks et al.
6,652,378 B2 * 11/2003 Cannon .................. G07F 17/32 463/20
6,652,380 B1 11/2003 Luciano
6,663,490 B2 12/2003 Soltys et al.
6,672,589 B1 1/2004 Lemke et al.
6,676,515 B1 1/2004 Baltz et al.
6,679,775 B1 1/2004 Luciano et al.
6,682,423 B2 1/2004 Brosnan et al.
6,685,559 B2 2/2004 Luciano et al.
6,712,696 B2 3/2004 Soltys et al.
6,712,698 B2 3/2004 Paulsen et al.
6,722,978 B2 4/2004 Valenti
6,722,985 B2 4/2004 Criss-Puszkiewicz et al.
6,729,956 B2 5/2004 Wolf et al.
6,743,095 B2 6/2004 Cole et al.
6,749,510 B2 6/2004 Giobbi
6,755,741 B1 6/2004 Rafaeli
6,758,751 B2 7/2004 Soltys et al.
6,790,142 B2 * 9/2004 Okada .................... G06Q 30/02 463/16
6,800,029 B2 10/2004 Rowe et al.
6,843,723 B2 1/2005 Joshi
6,846,238 B2 1/2005 Wells
6,848,995 B1 2/2005 Walker et al.
6,852,029 B2 2/2005 Baltz et al.
6,854,645 B1 2/2005 Somers, Jr. et al.
6,863,611 B1 3/2005 Morrow et al.
6,884,174 B2 4/2005 Lundy et al.
6,890,256 B2 5/2005 Walker et al.
6,896,618 B2 5/2005 Benoy et al.
6,897,624 B2 5/2005 Lys et al.
6,908,384 B1 6/2005 Luciano, Jr.
6,916,246 B1 7/2005 Luciano, Jr.
6,924,903 B2 8/2005 Brooks et al.
6,935,946 B2 8/2005 Yoseloff et al.
6,942,574 B1 9/2005 LeMay et al.
6,955,601 B2 10/2005 Seelig et al.
6,958,014 B1 10/2005 Luciano, Jr. et al.
6,984,174 B2 1/2006 Cannon et al.
6,991,543 B2 1/2006 Joshi
7,004,837 B1 2/2006 Crowder, Jr. et al.
7,022,017 B1 4/2006 Halbritter et al.
7,025,676 B2 4/2006 Cole et al.
7,036,012 B2 4/2006 Charrin
7,036,721 B2 5/2006 Dabrowski
7,063,617 B2 6/2006 Brosnan et al.
7,070,503 B2 7/2006 Rudolph
7,094,149 B2 8/2006 Walker et al.
7,112,138 B2 9/2006 Hedrick et al.
7,118,478 B2 10/2006 Fayter et al.
7,137,889 B1 11/2006 Luciano, Jr.
7,137,892 B2 11/2006 Sitrick
7,241,219 B2 7/2007 Walker et al.
7,255,351 B2 8/2007 Yoseloff et al.
7,285,049 B1 10/2007 Luciano, Jr. et al.
7,290,072 B2 10/2007 Quraishi et al.
7,297,062 B2 11/2007 Gatto et al.
7,322,885 B1 1/2008 Luciano, Jr. et al.
7,335,106 B2 2/2008 Johnson
7,357,714 B2 4/2008 Tessmer et al.
7,364,510 B2 4/2008 Walker et al.
7,392,470 B2 6/2008 Kammler
7,473,179 B2 1/2009 Xidos et al.
7,520,810 B2 4/2009 Dabrowski
7,674,177 B2 3/2010 Cole
7,704,147 B2 4/2010 Quraishi et al.
7,771,271 B2 8/2010 Walker et al.
7,819,750 B2 10/2010 Lam et al.
7,827,488 B2 11/2010 Sitrick
7,867,086 B2 1/2011 Sitrick
7,927,212 B2 4/2011 Hedrick et al.
8,133,102 B2 3/2012 Dabrowski
8,177,645 B2 5/2012 Walker et al.
8,419,543 B2 4/2013 Walker et al.
8,512,144 B2 8/2013 Johnson et al.
8,585,479 B2 11/2013 Ryan et al.
8,734,213 B2 5/2014 Dabrowski
8,784,213 B2 7/2014 Johnson
9,022,847 B2 5/2015 Dabrowski
9,098,965 B2 8/2015 Walker et al.
2001/0036866 A1 11/2001 Stockdale et al.
2002/0016202 A1 2/2002 Fertitta, III et al.
2002/0016829 A1 2/2002 Defosse
2002/0025850 A1 2/2002 Hafezi
2002/0058550 A1 5/2002 Pace et al.
2002/0062350 A1 5/2002 Maehiro
2002/0098888 A1 7/2002 Rowe et al.
2002/0115487 A1 8/2002 Wells
2002/0128932 A1 9/2002 Yung et al.
2002/0132663 A1 9/2002 Cumbers
2002/0142841 A1 10/2002 Boushy
2002/0147047 A1 10/2002 Letovsky et al.
2002/0155891 A1 * 10/2002 Okada .................... G06Q 30/02 463/42
2002/0160832 A1 10/2002 Burns et al.
2002/0169021 A1 11/2002 Urie et al.
2002/0177479 A1 11/2002 Walker et al.
2002/0177480 A1 11/2002 Rowe
2002/0196342 A1 12/2002 Walker et al.
2002/0198044 A1 12/2002 Walker et al.
2003/0004871 A1 1/2003 Rowe
2003/0013512 A1 1/2003 Rowe
2003/0013513 A1 1/2003 Rowe
2003/0013516 A1 1/2003 Walker et al.
2003/0013527 A1 1/2003 Rowe et al.
2003/0027631 A1 2/2003 Hedrick et al.
2003/0032474 A1 2/2003 Kaminkow
2003/0036425 A1 2/2003 Kaminkow et al.
2003/0054868 A1 3/2003 Paulsen et al.
2003/0054880 A1 3/2003 Lam et al.
2003/0054881 A1 3/2003 Hedrick et al.
2003/0064800 A1 4/2003 Jackson et al.
2003/0074106 A1 4/2003 Butler
2003/0078094 A1 4/2003 Gatto et al.
2003/0081824 A1 5/2003 Mennie et al.

(56) References Cited

U.S. PATENT DOCUMENTS

| | | | |
|---|---|---|---|
| 2003/0083943 A1* | 5/2003 | Adams | G06Q 30/02 705/14.23 |
| 2003/0096645 A1 | 5/2003 | Soltys et al. | |
| 2003/0100359 A1 | 5/2003 | Loose et al. | |
| 2003/0109302 A1 | 6/2003 | Rist | |
| 2003/0119579 A1 | 6/2003 | Walker et al. | |
| 2003/0139214 A1 | 7/2003 | Wolf et al. | |
| 2003/0149619 A1 | 8/2003 | Stanley et al. | |
| 2003/0162588 A1 | 8/2003 | Brosnan et al. | |
| 2003/0166412 A1 | 9/2003 | Marcu | |
| 2003/0171145 A1 | 9/2003 | Rowe | |
| 2003/0187736 A1 | 10/2003 | Teague et al. | |
| 2003/0190958 A1 | 10/2003 | Paulsen | |
| 2003/0195036 A1 | 10/2003 | Poole et al. | |
| 2003/0195037 A1 | 10/2003 | Vuong et al. | |
| 2003/0207711 A1 | 11/2003 | Rowe | |
| 2003/0216169 A1 | 11/2003 | Walker et al. | |
| 2003/0216966 A1 | 11/2003 | Saenz et al. | |
| 2003/0232647 A1 | 12/2003 | Moser | |
| 2004/0014526 A1 | 1/2004 | Kulas | |
| 2004/0024608 A1 | 2/2004 | Saenz et al. | |
| 2004/0032086 A1 | 2/2004 | Barragan | |
| 2004/0038735 A1 | 2/2004 | Steil et al. | |
| 2004/0039679 A1 | 2/2004 | Norton et al. | |
| 2004/0039695 A1 | 2/2004 | Rowe | |
| 2004/0043814 A1 | 3/2004 | Angell et al. | |
| 2004/0053663 A1 | 3/2004 | Paulsen et al. | |
| 2004/0077408 A1 | 4/2004 | D'Amico et al. | |
| 2004/0082385 A1 | 4/2004 | Silva et al. | |
| 2004/0092303 A1 | 5/2004 | George et al. | |
| 2004/0092315 A1 | 5/2004 | Boyd et al. | |
| 2004/0106449 A1 | 6/2004 | Walker et al. | |
| 2004/0113360 A1 | 6/2004 | George et al. | |
| 2004/0127284 A1* | 7/2004 | Walker | G07F 17/32 463/30 |
| 2004/0132531 A1 | 7/2004 | George et al. | |
| 2004/0132532 A1 | 7/2004 | Brosnan et al. | |
| 2004/0142739 A1 | 7/2004 | Loose et al. | |
| 2004/0143496 A1 | 7/2004 | Saenz | |
| 2004/0146975 A1 | 7/2004 | Yaver et al. | |
| 2004/0147299 A1 | 7/2004 | Morris et al. | |
| 2004/0152518 A1* | 8/2004 | Kogo | H04L 69/329 463/42 |
| 2004/0153748 A1 | 8/2004 | Fabrizi et al. | |
| 2004/0166917 A1 | 8/2004 | Lam et al. | |
| 2004/0166932 A1 | 8/2004 | Lam et al. | |
| 2004/0171423 A1 | 9/2004 | Silva et al. | |
| 2004/0209674 A1 | 10/2004 | Conover et al. | |
| 2004/0214622 A1 | 10/2004 | Atkinson | |
| 2004/0219975 A1 | 11/2004 | Soltys et al. | |
| 2004/0238319 A1 | 12/2004 | Hand et al. | |
| 2004/0254006 A1 | 12/2004 | Lam et al. | |
| 2004/0254009 A1 | 12/2004 | D'Amico et al. | |
| 2004/0254013 A1 | 12/2004 | Quraishi et al. | |
| 2004/0254014 A1 | 12/2004 | Quraishi et al. | |
| 2005/0003890 A1 | 1/2005 | Hedrick et al. | |
| 2005/0009600 A1 | 1/2005 | Rowe et al. | |
| 2005/0013527 A1 | 1/2005 | Doyle et al. | |
| 2005/0014558 A1 | 1/2005 | Estey | |
| 2005/0027381 A1 | 2/2005 | George et al. | |
| 2005/0032575 A1 | 2/2005 | Goforth et al. | |
| 2005/0037837 A1 | 2/2005 | Rowe | |
| 2005/0041161 A1 | 2/2005 | Dowling et al. | |
| 2005/0043086 A1 | 2/2005 | Schneider | |
| 2005/0054439 A1 | 3/2005 | Rowe et al. | |
| 2005/0054446 A1 | 3/2005 | Kammler et al. | |
| 2005/0059457 A1 | 3/2005 | Rothschild et al. | |
| 2005/0059480 A1 | 3/2005 | Soukup et al. | |
| 2005/0059485 A1 | 3/2005 | Paulsen et al. | |
| 2005/0061605 A1 | 3/2005 | Bell et al. | |
| 2005/0075165 A1 | 4/2005 | George et al. | |
| 2005/0075889 A1 | 4/2005 | Gomes et al. | |
| 2005/0085300 A1 | 4/2005 | Johnson | |
| 2005/0096112 A1 | 5/2005 | Guinn et al. | |
| 2005/0096129 A1 | 5/2005 | Walker et al. | |
| 2005/0099824 A1 | 5/2005 | Dowling et al. | |
| 2005/0119044 A1 | 6/2005 | Lim et al. | |
| 2005/0119048 A1 | 6/2005 | Soltys et al. | |
| 2005/0119052 A1 | 6/2005 | Russell et al. | |
| 2005/0137011 A1 | 6/2005 | Walker et al. | |
| 2005/0143166 A1 | 6/2005 | Walker et al. | |
| 2005/0153768 A1 | 7/2005 | Paulsen | |
| 2005/0153773 A1 | 7/2005 | Nguyen et al. | |
| 2005/0153776 A1 | 7/2005 | LeMay et al. | |
| 2005/0159203 A1 | 7/2005 | Bond et al. | |
| 2005/0170883 A1 | 8/2005 | Muskin | |
| 2005/0170892 A1 | 8/2005 | Atkinson | |
| 2005/0171808 A1 | 8/2005 | Saenz et al. | |
| 2005/0182647 A1 | 8/2005 | Saenz et al. | |
| 2005/0187012 A1 | 8/2005 | Walker et al. | |
| 2005/0197183 A1 | 9/2005 | Walker et al. | |
| 2005/0215310 A1 | 9/2005 | Boyd et al. | |
| 2005/0215316 A1 | 9/2005 | Rowe et al. | |
| 2005/0216120 A1 | 9/2005 | Rosenberg et al. | |
| 2005/0227771 A1 | 10/2005 | Nelson et al. | |
| 2005/0248299 A1 | 11/2005 | Chemel et al. | |
| 2005/0261057 A1 | 11/2005 | Bleich et al. | |
| 2005/0275626 A1 | 12/2005 | Mueller et al. | |
| 2005/0277471 A1 | 12/2005 | Russell et al. | |
| 2005/0282631 A1 | 12/2005 | Bonney et al. | |
| 2006/0019747 A1 | 1/2006 | Loose et al. | |
| 2006/0025206 A1 | 2/2006 | Walker et al. | |
| 2006/0046819 A1 | 3/2006 | Nguyen et al. | |
| 2006/0068906 A1 | 3/2006 | Morrow et al. | |
| 2006/0073870 A1 | 4/2006 | Cannon | |
| 2006/0084488 A1 | 4/2006 | Kinsley et al. | |
| 2006/0135230 A1 | 6/2006 | Godse et al. | |
| 2006/0135255 A1 | 6/2006 | Roth | |
| 2006/0154719 A1 | 7/2006 | Okuniewicz | |
| 2006/0154721 A1 | 7/2006 | Okuniewicz | |
| 2006/0178208 A1 | 8/2006 | Cole | |
| 2006/0211477 A1 | 9/2006 | Walker et al. | |
| 2006/0247027 A1 | 11/2006 | Walker et al. | |
| 2006/0252504 A1 | 11/2006 | Walker et al. | |
| 2006/0252505 A1 | 11/2006 | Walker et al. | |
| 2006/0287063 A1 | 12/2006 | Walker et al. | |
| 2007/0015569 A1 | 1/2007 | Norton et al. | |
| 2007/0069460 A1 | 3/2007 | Hein et al. | |
| 2007/0105617 A1 | 5/2007 | Walker et al. | |
| 2007/0121936 A1 | 5/2007 | Guillou et al. | |
| 2007/0129137 A1 | 6/2007 | Walker et al. | |
| 2007/0213124 A1 | 9/2007 | Walker et al. | |
| 2007/0259709 A1 | 11/2007 | Kelly et al. | |
| 2007/0265060 A1 | 11/2007 | Hornik et al. | |
| 2008/0009344 A1 | 1/2008 | Graham et al. | |
| 2008/0026816 A1 | 1/2008 | Sammon et al. | |
| 2008/0039190 A1 | 2/2008 | Walker et al. | |
| 2009/0156315 A1 | 6/2009 | Andersson et al. | |
| 2009/0291736 A1 | 11/2009 | Walker et al. | |
| 2010/0124983 A1 | 5/2010 | Gowin et al. | |
| 2012/0129587 A1 | 5/2012 | Nguyen et al. | |

FOREIGN PATENT DOCUMENTS

| | | |
|---|---|---|
| WO | WO 9524689 | 9/1995 |
| WO | WO 09712315 | 4/1997 |
| WO | WO 9859311 | 12/1998 |
| WO | WO 9922350 | 5/1999 |
| WO | WO 02/055163 | 7/2002 |
| WO | WO 03/089082 | 10/2003 |
| WO | WO 03/093986 | 11/2003 |
| WO | WO 2005/070509 | 8/2005 |
| WO | WO 2005/099839 | 10/2005 |

* cited by examiner

FIG. 4
Slot 1
Available AdLiner
Slot 2
BBQ Brisket Cheddar Melt $6.99
Slot 3
Order Applebee's Gift Certificates Today
Slot 4
Try Our Delicious Onion Peels Served
with a Creamy Horseradish Dipping Sauce.
Slot 5
Available AdLiner
Slot 6
BBQ Stack Steak $6.99
Slot 7
Hit the hand between 5-7PM
WIN 10,000 Bonus Points
Slot 8
Available AdLiner
Slot 9
Available AdLiner
Slot 10
Available AdLiner
123456

ENHANCED VIDEO GAMING MACHINE

PRIORITY CLAIM

This application is a continuation of, claims priority to and the benefit of U.S. patent application Ser. No. 14/333,112, filed Jul. 16, 2014, which is a continuation of, claims priority to and the benefit of U.S. patent application Ser. No. 11/968,633, filed on Jan. 2, 2008, now U.S. Pat. No. 8,784,213, which is a continuation of, claims priority to and the benefit of U.S. patent application Ser. No. 10/689,407, filed on Oct. 20, 2003, now U.S. Pat. No. 7,335,106, the entire contents of which are each incorporated by reference herein.

FIELD OF THE INVENTION

The present invention relates generally to the electronic video gaming industry and, more particularly to providing a closed-loop system that allows an operator of an electronic gaming system to create customized promotional events, display the promotional events on the video display of the electronic video game, monitor the activity of the electronic video game to determine if a player has earned an award, and then grant any earned awards to the player.

BACKGROUND OF THE INVENTION

Electronic video games have come along way. In the early days, the Odyssey system allowed a user to tape one of several plastic see-through diagrams onto their television screen. Various diagrams were available, such as basketball, hockey, football and pong. However, the underlying game was the same—it was just a variation of the original Pong game. Today, highly complex, nearly real-life graphics are available and the game controllers have more buttons than the most advanced combined remote controls for televisions. The gambling gaming industry has capitalized on this growth. The standard mechanical slot machines of yesterday have converged with the growth in the electronic video gaming industry to introduce a new line of electronic video games. Some of the more popular outgrowths of this convergence are the video poker, black jack and video slot machines.

The gambling gaming industry has also capitalized on applying the growth in networking technology. Today, the electronic games are connected through a network to a main server that monitors the play of the games, the payouts awarded, and even the identity of the parties that are playing the game. The blue-haired ladies with buckets of quarters have been replaced with blue-haired ladies wearing a string around their necks that is connected to magnetic-strip identification card. The magnetic strip identification cards, in some cases simply identify the player but, in other cases operate as a pre-paid card and maintain a value based on the initial value loaded when the card is obtained, augmented by the success or failure of the user at the electronic game. Prior to commencing play, the card is swiped or entered into a slot on the machine and the identity of the player is extracted. In addition, the value loaded onto the card can be read and loaded into the machine. As play commences, the value can be decremented or incremented based on the gambling results. All of this information can be fed into the main server and recorded into a database.

One of the problems that the gambling gaming industry faces is dealing with the amount of traffic that is transmitted through the network. One technique that has been employed to reduce this traffic is to filter out all plays except for payout plays. For instance, in video poker, a payout list is provided on the display to indicate what hands will result in what payouts. Any hands that do not qualify as a payout are simply ignored. The hands that result in a payout result in a data entry being transmitted through the network to the main server. Although this technique provides a solution for reducing network traffic, it advantageously results in filtering out valuable information that could be used by the operators of the games. For instance, being able to track the number of times that a user has played the game, the frequency of starting new games, the characteristics of the user in playing the game and the reactionary speed of the players could be valuable information. Thus, there is a need in the art for a technique to capture this valuable information without over taxing the network bandwidth by introducing an abundance of network traffic.

Another disadvantage of this technique is that it limits the flexibility of the game operators in providing promotional events with the gaming machines. For instance, if an operator decides to run a promotional event in which video poker players will receive special awards for obtaining hands that are not included in the payout list, the main server has no mechanism in which to track the awards. In fact, this type of promotional event has proven to be a common technique used by video gaming machine operators to encourage play. Today these events are handled in the following manner. If an operator decides to award players with a special payback for an arbitrary hand, such as obtaining three or four clubs on Saint Patrick's day for video poker, or having a total of five on a black jack hand on Cinco De Mayo, or other non-standard hands, the operator announces the promotion either via an audio announcement, posters or a marquee that is visible to the players. If a player meets the criteria set forth in the promotion, the player approaches an employee of the casino, or the manager/bartender in a restaurant/bar setting, and gives them notice of the win. The employee or manager/bartender then serves as the sole point of contact for granting the award. It should be quite apparent that such a system is very vulnerable to "foul-play". One extra-generous bartender trying to help out a friend or impress an attractive lady can easily falsify records and grant the awards to undeserving parties.

Such promotional events have proven to be very beneficial to gambling machine operators; however, the lack of control in granting the awards results in millions of dollars being lost every year. Thus, there is a need in the art for technique that allows gambling machine operators to reap the benefits of providing promotional events while minimizing the risk of loss associated with the payout of awards for these events.

SUMMARY OF THE INVENTION

The present invention provides a closed-loop system for defining, monitoring and awarding promotional events in a variety of settings. In one embodiment, the invention includes a device that can be embedded within, or operate in conjunction with a video gaming machine. In this embodiment, the present invention operates to augment the display of a video gaming machine to provide the display of entertainment feeds, such as television, pay-per-view movies and advertisements, as well as provide for the display of information pertaining to promotional events. In addition, the present invention allows operators of the video gaming machines to customize the display of the video gaming machine and to program the types, durations and awards associated with promotional events. The closed-loop operation allows for the display of promotional events on the screen of the video gaming machine, the monitoring the activity of the video gaming machine and the recording of information indicating that an award for a promotional event has been earned. Advantageously, the present invention enables an operator to track demographic information pertaining to the play of a particular video gaming machine including, but not limited to, the identity of the player, the frequency of play by that player, the amounts betted by that player, the level of risk or characteristic of play of that player, the reactionary speed of the player, and player strategy.

DETAILED DESCRIPTION

The present invention includes a device that can be embedded within, or operate in conjunction with a video gaming machine. Throughout this description, a video gaming machine will refer to all kinds of gambling machines, such as video poker, black jack, roulette, Keno and slot machines, as well as typical arcade video machines. More specifically, the present invention operates to augment the display of a video gaming machine to provide the display of entertainment feeds, such as television, pay-per-view movies and advertisements, as well as provide for the display of information pertaining to promotional events. Another aspect of the present invention is a system to allow operators of the video gaming machines to customize the display of the video gaming machine and to program the types, durations and awards associated with promotional events. Yet another aspect of the present invention is a closed-loop system that allows for the display of promotional events on the screen of the video gaming machine, monitor the activity of the video gaming machine and record information indicating that an award for a promotional event has been earned. Yet another aspect of the present invention is to provide a technique for tracking demographic information pertaining to the play of a particular video gaming machine including, but not limited to, the identity of the player, the frequency of play by that player, the amounts betted by that player, the level of risk or characteristic of play of that player, the reactionary speed of the player, etc.

Advantageously, this invention will allow operators of video gaming machines to maintain control over promotional events and the granting of awards pertaining to those events, as well as extract valuable information that can be used in augmenting the play of these video gaming machines to increase profitability and increase play time.

Turning now to the figures in which like references and labels refer like elements, several embodiments of the present invention are provided.

Figure 1:
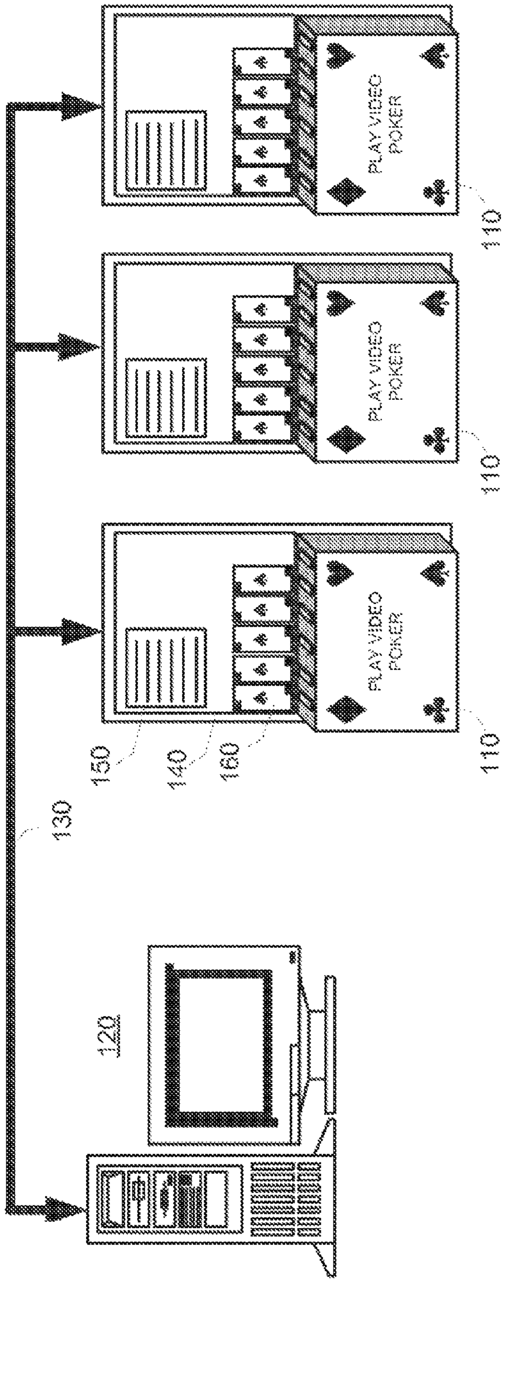
FIG. 1 PRIOR ART
FIG. 1 is a system diagram illustrating the typical interconnectivity of a video gaming machine environment.

FIG. 1 is a system diagram illustrating the typical interconnectivity of a video gaming machine environment. One or more video gaming machines 110 are connected to an operator server 120 through an operator network 130. In the illustrated environment, the video gaming machines 110 are video poker machines but it will be appreciated that other video gaming machines could likewise be connected to the same network. Typically, all of the operator's video gaming machines are connected to the operator's network and it is not necessary for the video gaming machines to be co-located or even be on the same premises. For the illustrated video poker machines, a display 140 is provided with a variety of content including a payout table 150 and a card stack 160.

In operation, each time a winning hand is obtained (i.e., one that matches a hand on the payout table), a message is sent from the video gaming machine 110 to the operator server 120 over the operator network 130 or, the information may be stored in the video gaming machine 110 or other memory storage device and the operator server 120 can periodically request or extract the stored information. Information is extracted from this message and stored into the operator server 120. The information may include, but is not limited to, the payout hand, the time and date the hand was achieved, the identity of the machine and the identity of the player. In the more modern video gaming machines, a magnetic card reader or equivalent device is included in the video gaming machine. The magnetic card reader can be used by players to insert a card that identifies the player and/or operates as a pre-loaded cash card to enable the game to be played.

Figure 2:
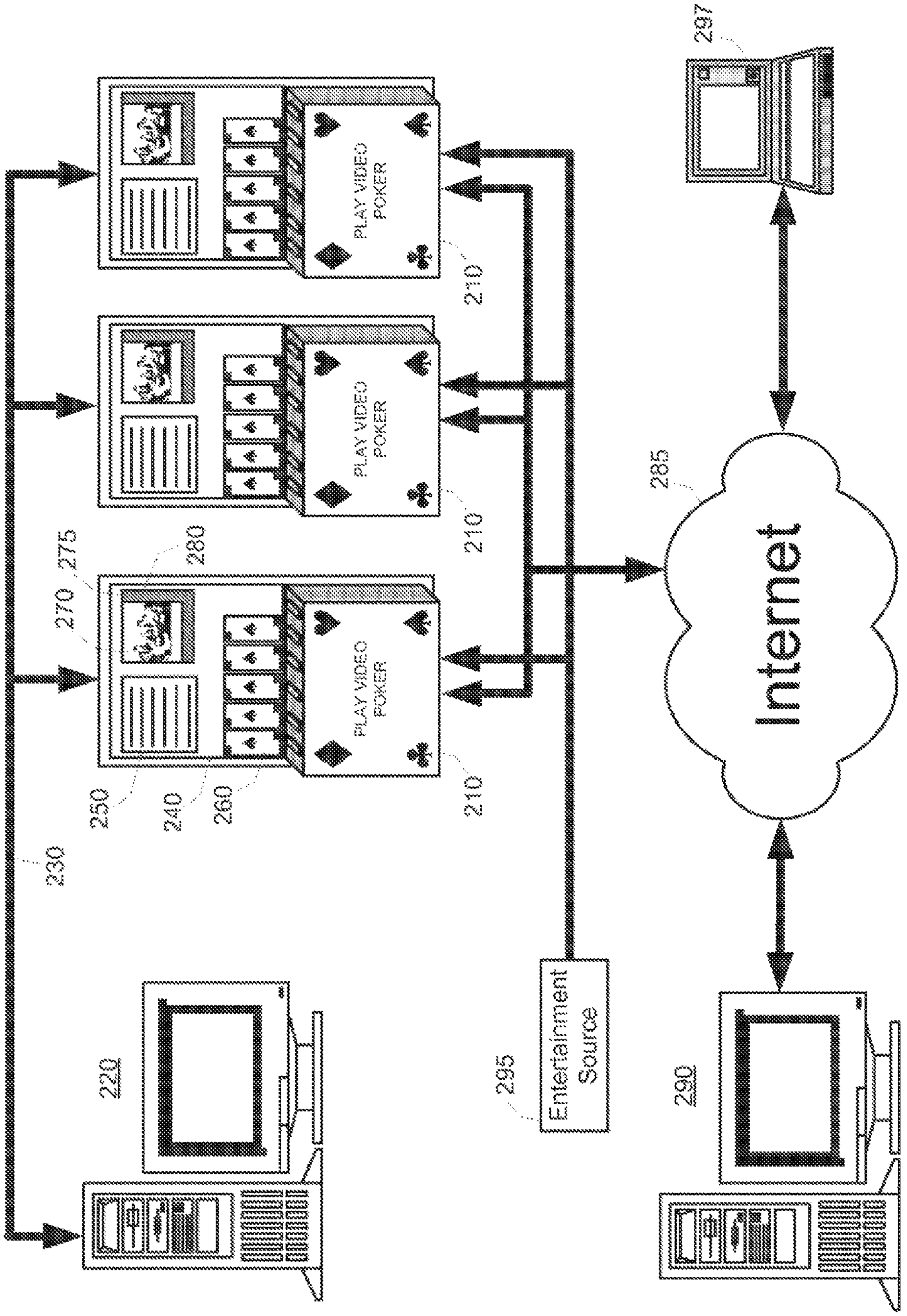
FIG. 2 is a system diagram illustrating the interconnectivity of a video gaming machine environment suitable for embodiments of the present invention.

FIG. 2 is a system diagram illustrating the interconnectivity of a video gaming machine environment suitable for embodiments of the present invention. One or more video gaming machines 210 are connected to an operator server 220 through the operator network 230. Again, in the illustrated environment, the video gaming machines 210 are video poker machines but it will be appreciated that other video gaming machines could likewise be connected to the same network. For the illustrated video poker machines, a display 240 is provided with a variety of content including a payout table 250 and a card stack 260. In addition, the present invention includes a section for the display of secondary content, such as entertainment content 270 and promotional or advertising content 275. Each of the video gaming machines is equipped, either internally or externally, with a controller box 280. The controller box 280 is interconnected with a main processor or controller for the video gaming machine as well as being connected to a promotional server 290. The controller box 280 is illustrated as being connected to the promotional server 290 through a network 285 which may include the Internet, or some other public or private network. However, the promotional server 290 may connect to the controller boxes 280 through a dial-up connection, wireless connection, or dedicated lines as well. The controller boxes 280 are also connected to an entertainment source 295. The entertainment source could be a cable television feed, satellite feed, recorded information or a variety of other sources.

In the embodiment illustrated in FIG. 2, the operations applicable to FIG. 1 are still in force and additional operations are added. The controller box 280 drives a portion of the display 240 by providing the entertainment content 270 and/or the advertising content 275.

The entertainment content 270 is provided to the display 240 by a feed from the entertainment content source 295 through the controller box 280. If the entertainment content source 295 includes multiple channels, the actual channel displayed can be controlled either through the controller box 280 or through the controller box 280 operating together with the promotional server 290. In some embodiments, the display 240 may be a touch sensitive screen. In these embodiments, the controller box 280 can also provide control buttons on the display 240 to allow a player to select a particular entertainment content channel, adjust the volume, hide the display, freeze the display, zoom in or out on the display, mute the audio, or the like. In other embodiments, special keys or buttons can be added to the machine, or existing keys or buttons can be redefined to facilitate this functionality.

The advertising content 275 is provided to the display 240 either by a feed from the entertainment content source 295 under the control of the controller box 280 or, from the promotional server 290 under the control of the controller box 280. For advertisement content from the entertainment feed, the operation is similar to that described for the entertainment content. However, for advertising content 275 from the promotional server 290, several innovative capabilities are provided. One such innovative capability is allowing the operator of the video gaming machines 210 to customize promotional events and advertise the promotional events on the display 240 of the video gaming machine 210. Another such innovative capability is enabling the play of the video gaming machine 210 to be monitored in view of the promotional event and control the granting of awards for the promotional event in a closed-loop manner.

The operator of the video gaming machines can customize the promotional events available on the video gaming machines 210 through the use of the promotional server 290. The operator can directly access the promotional server 290 or can access the promotional server through the network 285 from a remote machine 297. In practice, the promotional server 290 executes a software program that provides a programming functionality for promotional events. The actual configuration of the software program can vary between embodiments but in general, the software program includes, but is not limited to the following functionality:

(a) creation of content to display for promotional events;
(b) establishing schedule of promotional events; and
(c) driving video gaming machines (Closed-loop Operation).

Creating Content for Promotional Events

Figure 3A:
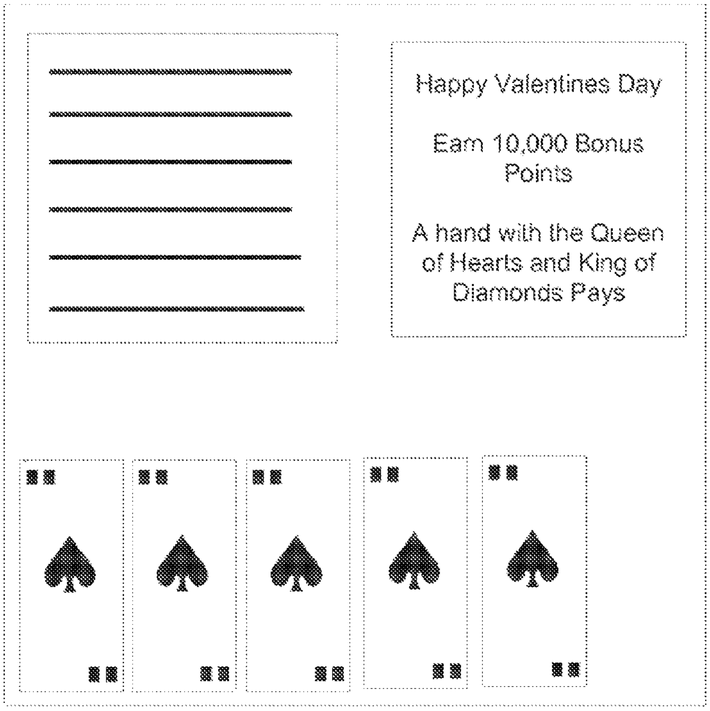
FIG. 3*a*-3*b* illustrate two exemplary displays to advertise a promotional event.
Figure 3B:
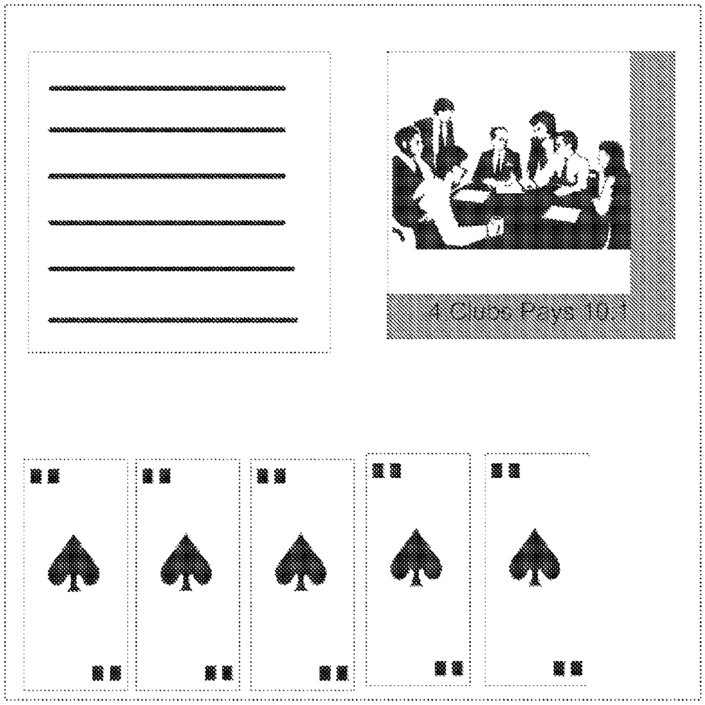

The operator creates content to display for a promotional event. The display of the content can vary from embodiment to embodiment. FIG. 3*a*-3*b* illustrate two exemplary displays to advertise a promotional event. The content could include graphics, text, moving video, audio or a combination of any of these. The promotional server 290 allows the content to be created either utilizing the software program or to be created elsewhere and imported into the promotional server 290. The promotional server 290 maintains a database of the promotional content and the scheduling information. The operator is able to create multiple displays for a variety of promotional events and store them into the promotional server 290 for current use or for later use. FIG. 3*a* shows a display format that encompasses the display area for both the entertainment content 270 and the advertising content 275. FIG. 3*b* shows a display format that encompasses only the display area for the advertisement content 275. Other configurations are also anticipated such as, but not limited to, flashing the entire display 240, scrolling across a portion of the display 240 and encompassing the entire display 240 for a period of time. Once the content has been created, the operator can establish a schedule for the promotional events.

Establishing a Schedule

Figure 4:
FIG. 4 is screen shot illustrating one embodiment of the playlist.

The operator establishes a schedule for the promotional events that can include, among other parameters, the date and time for the event, the duration of the event, and the display content to promote the event. In one embodiment, the schedule is presented in the form of a playlist. Each item in the playlist can be customized and scheduled. FIG. 4 is screen shot illustrating one embodiment of the playlist. The playlist consist of multiple slots (Slot 1-10 in this example) and can be spread out over multiple pages (page 1-6 in this example). In the illustrated embodiment, Slots 2-4 and Slot 6 hold advertising content. Slot 7 has been programmed to hold promotional content. Furthermore, the illustrated embodiment is implemented in mark-up languages and viewable through a standard browser, however, those skilled in the art will appreciate that the particular implementation language and/or technology, as well as the specific formats, look-and-feel and operations of the software program are independent of and not relevant to the particular operations of the described aspects of the present invention. Thus, although the remaining examples will be described as including particular operations that result in particular screen views, the present invention is not limited in such a manner.

To edit or create promotional content, the user selects the applicable Slot X hyperlink. For instance, if an operator desires to create the promotional event that is currently displayed in Slot 7, the operator selects Slot 7 and the resulting display is illustrated in FIG. 5.

Figure 5:
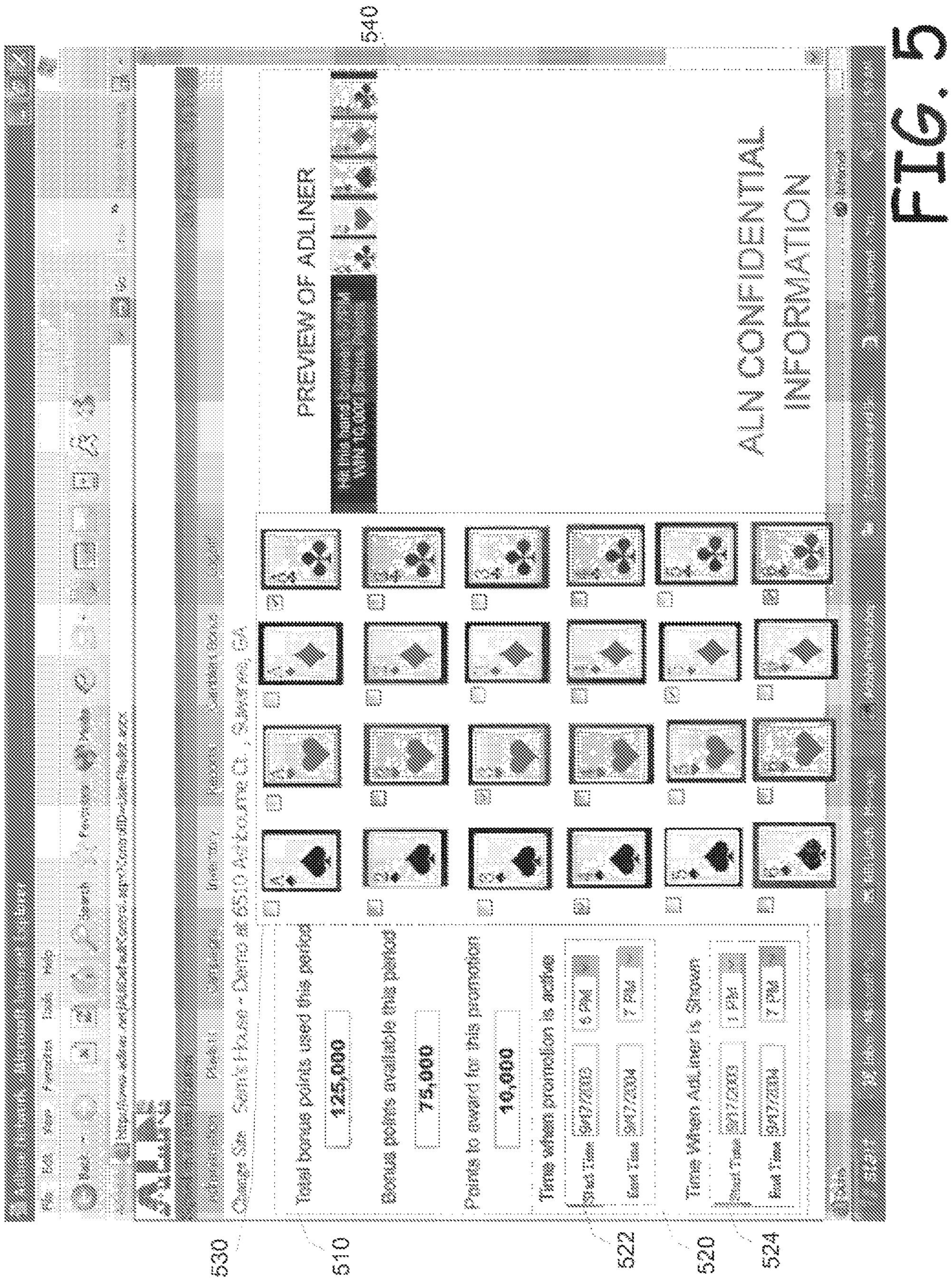
FIG. 5 is a screen shot illustrating the programming screen for promotional content.

FIG. 5 is a screen shot illustrating the programming screen for a promotional event. The programming screen includes a bonus area 510, a scheduling area 520, a promotional definition area 530 and a preview of the promotional content area 540. The bonus area 510 identifies the bonus points that have been awarded during a particular period of time. This feature allows the operator to keep track of the amount of bonus points that have been awarded. It should be appreciated that the bonus points can represent a variety of awards. For instance, in a gambling embodiment, the bonus points may translate directly into monetary units. In a gaming scenario, the bonus points may represent credits for additional play or can be redeemed for prizes. In a charitable situation, the bonus points may translate into bidding power for a silent auction. In a restaurant/bar setting, the bonus points may translate into discounts for food or beverages. It should be appreciated that additional uses could easily be identified for various scenarios. The bonus area 510 also identifies the bonus point available. This may represent the amount of bonus awards that the operator has remaining in his desired budget. For instance, for a particular period, an operator may budget bonus points and the budgeted amount will be the sum of the total bonus points awarded and the bonus points available for this period. The bonus area 510 also includes an editable field in which the operator can select the bonus points that will be awarded for a particular promotional event. In the illustrated embodiment, the operator has selected 10,000 bonus points. In one embodiment, the promotional event can be scheduled to run for a particular period of time and/or until a budgeted amount of bonus points have been awarded.

The scheduling area 520 includes two sub-areas, the promotion active time 522 and the promotion display active time 524. During the programmed promotion display active time, the promotional content identified in the promotional content area 540 will be available for display. During the programmed promotion active time the promotion will actually be in effect. In some embodiments, an additional field can be displayed and edited to allow the operator to select the duration of time that will be dedicated to the slot in which the promotional event is programmed. For example, each programmed slot may be allocated to be 15 seconds and be cycled on the display in a round-robin fashion. Thus, when actual time falls within the programmed display active time for the promotional event, the promotional content will be displayed in a periodic manner. It should be appreciated that priorities could be assigned to particular slots and that varying time frames can be allocated for various slots also.

The promotional definition area 530 allows the operator to define the particular winning criteria for the promotional event. In the illustrated embodiment, the operator has selected the following hand to constitute a win:

A♣ 3♥ 4♠ 5♦ 6♣

The operator may also program “don’t care” or “wild card” conditions also. For instance, on Valentines Day, the operator may run a promotion in which the following hands constitute a win:

Q♥K♥ (don’t care) (don’t care) (don’t care) or

Q♥ (wild card) (don’t care) (don’t care) (don’t care) where a wild card is any card that is a heart.

Thus, a player that draws the Q♥ and the K♥ or any heart card in any hand during the active time for the promotion would be awarded the bonus points.

The preview of the promotional content area 540 indicates the content that will be displayed during the programmed program display active time. In some embodiments, multiple content formats can be provided and the operator can select from the various formats. In other embodiments, an operator may select multiple formats that can be cycled through or randomly selected during the programmed promotion display time. It should be appreciated that the software program can automatically generate the display content, allow an editing function so that the operator can customize the display content, or allow the operator to import display content created from another application.

Closed-Loop Operation

The present invention also provides for closed-loop operation. The closed-loop operation, in general, allows for the recording of events that satisfy the winning criteria and then reporting the win to the operator in a controlled and secure or reliable manner. Advantageously, this aspect of the present invention helps to reduce or eliminate fraud in the awarding of bonus points to players.

In operation, the controller box 280 interfaces to the processor of the gaming machine 210 and to the promotional server 290. The controller box monitors activity information pertaining to the operation of the gaming machine. Although the gaming machines typically filter out hands that are transmitted over the network 130 to the operator server 120, the gaming machines 210 still include the logic to identify the hands that are not classified as winning hands on the payout table 250. The controller box 280 interfaces with the processor to identify all hands that are dealt.

This aspect of the present invention advantageously enables the monitoring and tracking of a variety of demographic information. For instance, in a video poker game environment, the controller box 280 can monitor and track the operations of a player, such as hands dealt, cards held, cards discarded, etc. This information could be used for a variety of purposes including identifying unsophisticated players that may need to attend a help session or players that are trying to trick the machine.

The present invention also includes the ability for the player to interact with the gaming machine 210 in response to the promotion. For instance, during a promotion, or even during standard play, the present invention can operate to display a message to the player to prompt for an action, and then provide an award based on that action. One example is to display a message directed towards a particular gaming machine 210 or a particular player, or a message directed across multiple gaming machines 210. A typical message could state that the first 50 players to perform a particular task will receive an award. The particular task could be a variety of different tasks, including but not limited to, pressing a certain button on the gaming machine 210, playing an additional round on the gaming machine 210, betting a certain amount, betting a threshold amount for a given number of hands, and cashing in a requested number of bonus points. The award could also be a variety of things, such as a coupon for a $2.00 steak dinner, a 10% discount at the gift shop, or a free round of golf with the purchase of a round. Depending on the particular embodiment, the players responding to the prompt may receive a printed receipt generated by the gaming machine 210, have the coupon recorded onto a magnetic strip of a card, receive a token, be requested to enter identification information into the gaming machine that can later be used to verify the win, or the machine can simply sound a bell or flash a light to get the attention of a game room attendant that can provide the coupon to the player.

In another example, the message may state that a player can exchange points or perform tasks to view pay-per-view content. The response time for performing the task may be restricted (i.e., in the next 5 minutes or immediately) or may be conditional on other attributes such as betting amounts, playing time, or the like. In one embodiment, while the promotional message is displayed, the player can respond by touching the displayed promotion on a touch sensitive screen. A confirmation message will then appear to verify that the player wants to exchange points, or pay for the reception of the pay-per-view content. In one embodiment, the gaming machine can print out a ticket that the player can use to access the pay-per-view content. In another embodiment, the pay-per-view content may directly appear on the gaming machines screen. In this embodiment, the player may be required to meet certain playing thresholds to keep the pay-per-view content on the screen (i.e., minimum number of bets per hour, betting a minimum amount).

Another variation on promotional events that can be implemented in an embodiment of the present invention is a tiered promotion. The tiered promotion requires a player to opt-in to a promotion. In operation, a promotional message is provided to the player indicating that the player can pay an additional fee (i.e. points or money) to win a chance at 10,000 additional bonus points if they meet certain win criteria. Such a promotion could be limited on a per session basis In one embodiment, the promotional server 290 may download into the controller box 280 all of the information regarding the scheduling of advertisements and promotional events. In this embodiment, the controller box 280 operates to control the display and timing of the display. In addition, during the programmed promotion active time, the controller box 280 will monitor for hands that meet the winning criteria. Once a winning hand is identified, the controller box 280 will notify the promotional event server 290 and provide any necessary information such as, but not limited to, the identity of the video gaming machine 210, the identity of the player, the time and date and the particular hand that satisfies the criteria.

In another embodiment, the controller box 280 may operate more similar to a dummy terminal. In this embodiment, the promotional event sever 290 is responsible for controlling the timing and content of the display and continuously downloads the necessary information to the controller box 280. The controller box 280 then controls the actual display of the content onto the display screen 240 of the video gaming machine 210. The controller box 280 then sends information to the promotional event server 290 for every hand that is dealt and the promotional event server 290 monitors the hands to identify when winning criteria has been met.

It should be appreciated that these two embodiments are just two illustrative embodiments as to how the processing power for the closed-loop system can be allocated. Those skilled in the art will appreciate that the actual processing power attributed to the various tasks can be allocated between the controller box 280 and the promotional event server 290 in a variety of fashions and the present invention is not limited to any particular configuration. In fact, all of the functionality can be incorporated into either the controller box 280 or the promotional event server 290 and totally eliminate the need for the other device.

Ultimately, the promotional event server 290 obtains the information necessary to identify the player and the award that has been earned by the player. The operator can extract this information directly from the promotional event server 290, by accessing the promotional event server 290 through the network, or the promotional event server 290 may also include a direct or indirect interface to the operator server 120 over which the promotional event server 290 uploads the information.

Thus, it should be evident that the present invention eliminates the risk of loss associated with the current art in which the operator is dependent upon the integrity of an employee or any other party that would ordinarily be responsible for being approached by a player purporting to have qualified as a winner, who then must physically visit the particular gaming machine 210 to observe the display, and then record the information and report that information back to the operator.

Figure 6:
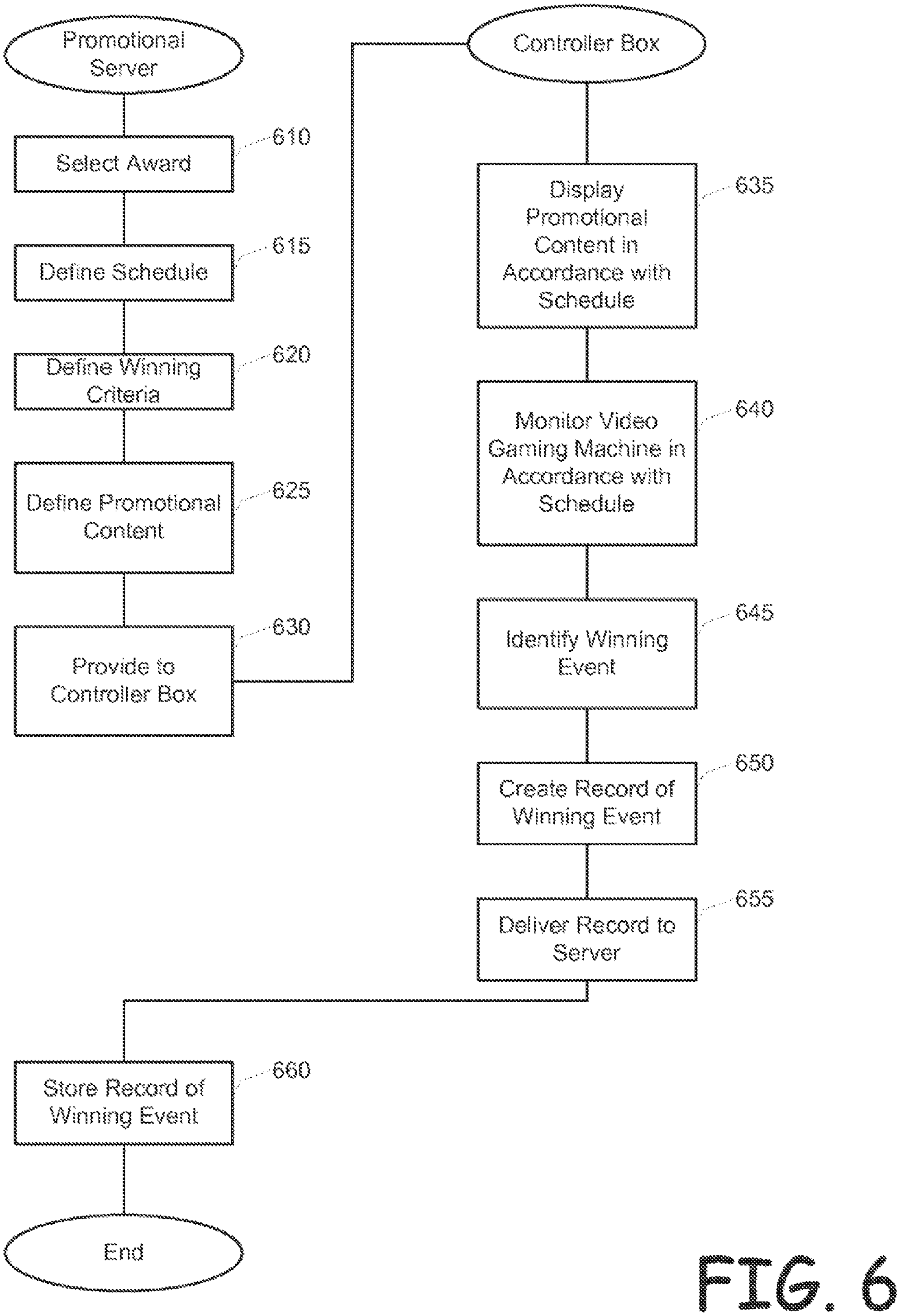
FIG. 6 is a flow diagram summarizing the operations of the promotional server and the controller box.

FIG. 6 is a flow diagram summarizing the operations of the promotional server and the controller box. At step 610, the operator using the promotional server identifies the award to be associated with a new promotional event. At step 615, the operator defines the schedule for the promotional event. The schedule includes at least two components. One component is the time period that advertising content for the promotional event will be displayed. The other component is the actual time period during which the promotional event will be active. In some embodiments these two time periods can be identical thus eliminating the need to program two time periods. At step 620, the operator defines the winning criteria. In the embodiment illustrated in FIG. 5, this step includes selecting the cards to be included in the winning hand. However, this step can vary greatly depending on the embodiment of the invention. For instance, in a restaurant setting, this step may include identifying a menu item. At step 625, the operator defines the promotional content to be displayed for advertising the promotional event. This step could involve importing a graphic or text file from another source or actually defining the art work. At step 630, the information pertaining to the promotional event is provided to the controller box 280.

It should be appreciated that multiple promotional events can be scheduled and loaded into the controller box 280. In fact, multiple promotional events can be concurrently active. The controller box can receive a download of all scheduled promotional events and at step 635, the controller box displays the advertising content pertaining to the promotional events in accordance with the schedule associated with the promotional events. Alternatively, the promotional server may only download information to the controller box when the information is active. At step 640, the controller box monitors the activity of the gaming machine in accordance with the schedule associated with the active time period for the promotional event. At step 645, the controller box 280 identifies that the criteria for a winning event has been satisfied. At step 650, the controller box 280 creates a record regarding the winning event. Depending on the particular embodiment, the content in this record can vary greatly. Typical embodiments will include information such as, but not limited to, the identity of the gaming machine, the identity of the player, the time and date of the winning event, the winning event, the identification of the promotional event, the address of the gaming machine, the location of the gaming machine, etc. In some embodiments, the controller may include a GPS signal receiver that can be used to identify the location of the gaming machine. At step 655, the record is delivered to the promotional server 290.

It should be appreciated that the present invention also enables the reporting of other activity that is not necessarily associated with a promotional event. For instance, the operator may want to establish a maintenance schedule for the equipment based on particular criteria. The present invention can be used to define such criteria and monitor for the satisfaction of the criteria. For instance, such criteria could include events such as hours of usage, number of key presses, number of key presses for particular keys, detection of operating errors, detection of loss of power, or the like.

The present invention could also be used to identify the amount of financial exposure an operator has with his currently running promotions. For instance, if a budget has been set for the promotion, the system can monitor the payouts that have been awarded during the promotional event and, based upon this information the operator or the system can make decisions to limit or expand the duration or winning criteria of the promotion. Likewise, the operator can allocate additional bonus points to the budget, or further limit the budget of a promotional event based on the operator's historical business performance with the promotion.

From the information obtained through the use of various embodiments of the present invention, the success or failures of certain promotions can be analyzed. This analysis can be used to identify particular attributes that may have contributed to the success or failure of the promotion. For instance, the duration of the promotion, the time of day the promotion was run, the date of the promotion, the amount of awards available for the promotion and the winning criteria of the promotion are several attributes that can be monitored and tracked to determine what effect, if any, these attributes have on driving the behavior of the players. As an example, an operator may determine that a particular promotion that runs in the morning may be more likely to generate playing time from players than is generated when the promotion is run in the evening.

The promotional server 290 stores received records at step 660 and maintains a database of records received from the controller box 280. It should be appreciated that the promotional server 290 can support many controller boxes 280 for many different operators. Thus, the promotional server 290 includes a security mechanism to restrict access to records and files. Such security mechanism may be password protection, or may include more advanced security techniques that should be familiar to those skilled in the art.

Operation in Other Settings

Although the present invention has been described with particular reference to a gaming or gambling scenario, the present invention, or aspects of the present invention, may be equally applied in a variety of other settings. For instance, in a restaurant setting, aspects of the present invention can be used to display special events within the restaurant. Thus, if a restaurant owner wants to promote a particular item on the menu, the restaurant owner may program a promotional event to be displayed on monitors within the restaurant. One example of such an event may be that a 20% discount is available to any patrons ordering the chicken fried steak during a particular period of time or day. In the typical restaurant setting, this embodiment is dependent upon accurate reporting by the waiter or waitress, however, in this embodiment; the integrity afforded by the closed-loop system is not as important as in the gambling scenario.

The present invention can also be used for performing management or controlling functions in various environments. For instance, in the restaurant setting again, various criteria can be entered as the basis of "winning events" where the winning events define particular management or control events. For instance, winning events may be defined to monitor inventory levels. In this scenario, if the inventory of a particular item drops below a particular threshold, it may trigger a reorder message. As another example, if the inventory for a perishable item is in stock beyond a certain date or time period, a message can be triggered to identify that item as being expired. As yet another example, the winning event may identify a particular product and the ingredients of that product. In this scenario, a message can be triggered based on the duration that the product should exist on the shelf or be available to patrons prior to the expiration. In addition, a message may be triggered to indicate that the inventory of ingredients to create this product has decreased beyond a particular threshold. Other criteria that can be included in this scenario could be the historical pattern of the pace of selling this product. In each of these scenarios, the generated messages can be displayed on a monitor or sent to a communication device to notify the responsible parties.

The present invention could also be incorporated into a bowling alley scenario. In this embodiment, the controller box 280 interfaces to the scoring control mechanism for the bowling alley. On the individual scoring screens, various promotional events can be displayed, such as, hitting a strike between the hours of 3 pm to 4 pm will award a free game to the bowler.

In the description and claims, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. It will be appreciated that other uses of the present invention are also anticipated. The described embodiments comprise different features, not all of which are required in all embodiments of the invention. Some embodiments of the present invention utilize only some of the features or possible combinations of the features. For instance, the controller box 280 has been described as interfacing to the processor and display of a particular machine. In some embodiments, the display and the processor may be totally independent. And example of such a scenario would be in a setting that the display includes a television or video monitor and the controller box 280 monitors activity of an independent device such as a juke box, trivia machine, point-of-sale terminal or arcade machine. Variations of embodiments of the present invention that are described and embodiments of the present invention comprising different combinations of features noted in the described embodiments will occur to persons of skilled in the art. The scope of the invention is limited only by the following claims.

The invention claimed is:

1. A device comprising:

a processor;

a memory device which stores a plurality of instructions, which when executed by the processor, cause the processor to:

(a) receive content from a server, said server being distinct from the processor, and (b) thereafter, cause a service window of a gaming machine display device of a gaming machine to display the received content, the service window being associated with a first portion of the gaming machine display device, and said gaming machine including a gaming machine processor distinct from the processor, said gaming machine processor configured to execute a plurality of gaming machine instructions stored by a gaming machine memory device to cause the gaming machine processor to:

(i) if a physical item is received via an acceptor, establish a credit balance based, at least in part, on a monetary value associated with the received physical item, (ii) for a play of a game:

(A) determine a game outcome, (B) cause a second, different portion of the gaming machine display device to display the determined game outcome, wherein the second, different portion of the gaming machine display device is independent of the first portion of the claming machine display device, (C) determine any award associated with the determined game outcome, and (D) cause the gaming machine display device to display any determined award associated with the determined game outcome, and (iii) if a cashout input is received via a cashout device, cause an initiation of a payout associated with the credit balance.

2. The device of claim 1, wherein the content is selected from the group consisting of: entertainment content, promotional content, and advertising content.

3. The device of claim 1, wherein the server includes a promotional server.

4. A device comprising:

a processor;

a memory device which stores a plurality of instructions, which when executed by the processor, cause the processor to:

(a) receive content from a server, said server being distinct from the processor, and (b) if at least one designated actuation of at least one gaming machine input device of a gaming machine is received, cause a gaming machine display device of the gaming machine to display the received content, said gaming machine including a gaming machine processor distinct from the processor, said gaming machine processor configured to execute a plurality of gaming machine instructions stored by a gaming machine memory device to cause the gaming machine processor to:

(i) if a physical item is received via an acceptor, establish a credit balance based, at least in part, on a monetary value associated with the received physical item, (ii) for a play of a game:

(A) determine a game outcome, (B) cause the gaming machine display device to display the determined game outcome, (C) determine any award associated with the determined game outcome, and (D) cause the gaming machine display device to display any determined award associated with the determined game outcome, and (iii) if a cashout input is received via a cashout device, cause an initiation of a payout associated with the credit balance.

5. The device of claim 4, wherein the content is selected from the group consisting of: entertainment content, promotional content, and advertising content.

6. The device of claim 4, wherein the server includes a promotional server.

7. The device of claim 4, wherein the at least one designated actuation of the at least one gaming machine input device of the gaming machine includes an actuation associated with the play of the game.

8. The device of claim 4, wherein said received content is displayed in a service window of the gaming machine display device of the gaming machine.

9. The device of claim 8, wherein the service window includes a first portion of the gaming machine display device which is independent of a second, different portion of the gaming machine display device in which any determined game outcomes are displayed and any determined awards are displayed.

10. A method of operating a device, said method comprising:

(a) receiving content from a server, said server being distinct from the device, and (b) thereafter, causing a service window of a gaming machine display device of a gaming machine to display the received content, wherein the service window is associated with a first portion of the gaming machine display device, and said gaming machine is distinct from said device and for a play of a game, said gaming machine is configured to:

(i) determine a game outcome, (ii) cause a second, different portion of the gaming machine display device to display the determined game outcome, wherein the second, different portion of the gaming machine display device is independent of the first portion of the gaming machine display device, (iii) determine any award associated with the determined game outcome, and (iv) cause the gaming machine display device to display any determined award associated with the determined game outcome, wherein a credit balance is increasable based on any determined award associated with the determined game outcome and said credit balance is:

(A) increasable via an acceptor of a physical item associated with a monetary value, and (B) decreasable via a cashout device configured to receive an input to cause an initiation of a payout associated with the credit balance.

11. The method of claim 10, wherein the content is selected from the group consisting of: entertainment content, promotional content, and advertising content.

12. The method of claim 10, wherein the server includes a promotional server.

13. The method of claim 10, which is executed through a data network.

14. The method of claim 13, wherein the data network is an internet.

15. A method of operating a device, said device comprising:

(a) receiving content from a server, said server being distinct from the device, and (b) if at least one designated actuation of at least one gaming machine input device of a gaming machine is received, causing a gaming machine display device of the gaming machine to display the received content, wherein said gaming machine is distinct from said device and for a play of a game, said gaming machine is configured to:

(i) determine a game outcome, (ii) cause the gaming machine display device to display the determined game outcome, (iii) determine any award associated with the determined game outcome, and (iv) cause the gaming machine display device to display any determined award associated with the determined game outcome, wherein a credit balance is increasable based on any determined award associated with the determined game outcome and said credit balance is:

(A) increasable via an acceptor of a physical item associated with a monetary value, and (B) decreasable via a cashout device configured to receive an input to cause an initiation of a payout associated with the credit balance.

16. The method of claim 15, wherein the content is selected from the group consisting of: entertainment content, promotional content, and advertising content.

17. The method of claim 15, wherein the server includes a promotional server.

18. The method of claim 15, wherein the at least one designated actuation of the at least one gaming machine input device of the gaming machine includes an actuation associated with the play of the game.

19. The method of claim 15, wherein said received content is displayed in a service window of the gaming machine display device of the gaming machine.

20. The method of claim 19, wherein the service window includes a first portion of the gaming machine display device which is independent of a second, different portion of the gaming machine display device in which any determined game outcomes are displayed and any determined awards are displayed.

21. The method of claim 15, which is executed through a data network.

22. The method of claim 21, wherein the data network is an internet.

* * * * *